(No Model.)
S. V. REHART & T. E. BERNARD.
HAY RAKE ATTACHMENT.
No. 548,594. Patented Oct. 22, 1895.
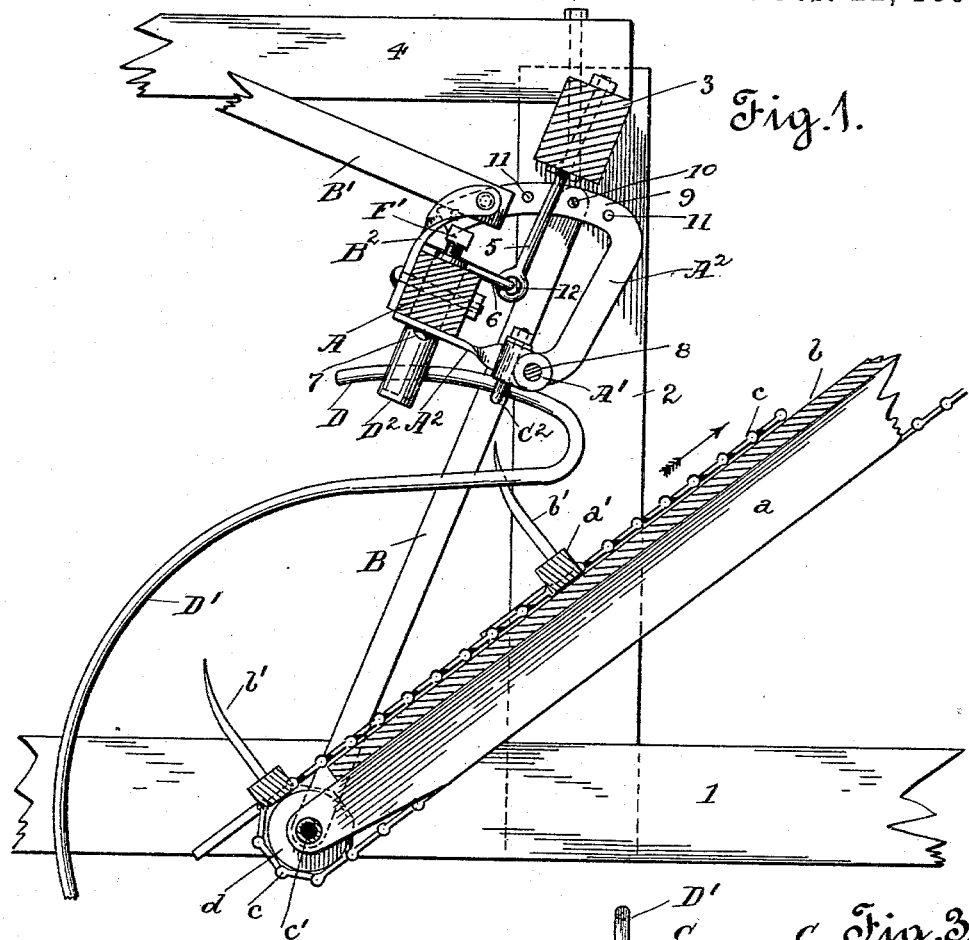
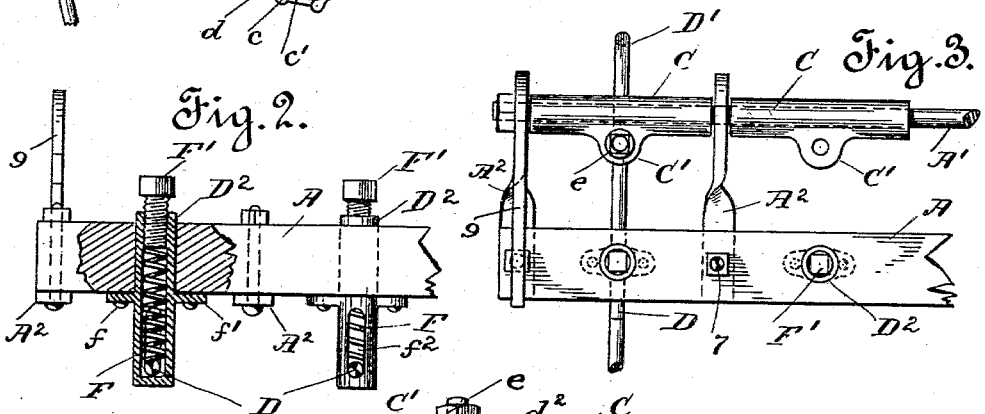
Witnesses.
J. E. Monteverde
W. H. Cobb
Inventors
Solomon V. Rehart
Thomas E. Bernard
by N. A. Acker
atty

UNITED STATES PATENT OFFICE.

SOLOMON V. REHART AND THOMAS E. BERNARD, OF LAKE VIEW, OREGON; SAID BERNARD ASSIGNOR TO SAID REHART.

HAY-RAKE ATTACHMENT.

SPECIFICATION forming part of Letters Patent No. 548,594, dated October 22, 1895.

Application filed January 7, 1895. Serial No. 534,162. (No model.)

*To all whom it may concern:*

Be it known that we, SOLOMON V. REHART and THOMAS E. BERNARD, citizens of the United States, residing at Lake View, in the county of Lake and State of Oregon, have invented certain new and useful Improvements in Hay-Rake Attachments; and we do hereby declare the following to be a full, clear, and exact description of said invention, such as will enable others skilled in the art to which it most nearly appertains to make, use, and practice the same.

Our present invention relates to certain new and useful attaching devices for the rake-teeth of a hay-rake, which consists in the arrangement of parts and details of construction, as will be hereinafter more fully set forth in the drawings, and described and pointed out in the specification.

The present invention is designed more especially for use in connection with that character of a hay-rake fully set forth in our application papers executed concurrently herewith for Letters Patent upon a combined hay rake and loader, to which reference is hereby made, the object of the present invention being to provide a simple and effective device for suspending the rake-teeth and regulating the pressure thereof and for evenly distributing the weight of the picker-elevator, so as to cause the least possible weight thereof to come upon the rake beam or head in order to reduce the power necessary to raise the rake-teeth to a minimum.

Referring to the drawings forming a part of this application for a more comprehensive understanding of the invention, Figure 1 is a sectional view in side elevation of a portion of a hay-rake, showing the attachment for holding the rake-teeth in position and regulating the tension thereof and the manner of suspending the lower portion of the picker-elevator. Fig 2 is a broken detail view of the rake beam or head, showing the sleeve secured thereto and spring and screw-bolt located within the sleeve for regulating the pressure of the rake-teeth. Fig. 3 is a top plan view of the mechanism illustrated by Fig. 1, the frame, operating-levers, and picker-elevator being removed. Fig. 4 is a detail view showing one of the thimbles for holding the rake-tooth in locked position, said thimble being shown in front elevation; and Fig. 5 is an end view of the device illustrated by Fig. 4.

The numeral 1 indicates one of the side pieces of the rake-frame, 2 one of the vertical standards for supporting the cross-beam 3, and 4 the lever for raising and lowering the rake-frame, while $a$ designates one of the side pieces of the platform $b$ of the picker-elevator; $c$, one of the sprocket-chains of said elevator; $a'$, the connecting-slats; $b'$, the picker-teeth; $c'$, the lower shaft to which the sprocket-wheels $d$ over which the sprocket-chains travel is secured, all of which parts will be found fully described in our aforesaid application for Letters Patent upon a combined rake and loader, filed January 7, 1895, Serial No. 534,161.

The rake beam or head is represented by the letter A, which is suspended from the cross-beam 3 by links 5 6, said rake-beam being connected to the cross-rod $A'$ by the strap $A^2$. One end of this strap is secured to the under face of the rake-beam by bolts 7, while the cross-shaft $A'$ passes through the opening 8 of the strap, and thus holds the rake-beam a distance from the cross-shaft. The portion of the connecting-strap $A^2$ beyond the cross-shaft $A'$ is bent upwardly and thence rearwardly, being in shape that of a bell-crank lever, to the arm 9 of which is movably secured the upper end of the connecting strap or rod B, the lower end of which is connected to the lower cross-shaft $c'$ of the picker-elevator, the said elevator being thus suspended from the bell-crank portion of the strap $A^2$. The upper end of the connecting rod or bond B is connected to the arm 9 by means of the pin 10, which passes through the said strap and one of the perforations 11 of the arm 9. By changing the pin from one hole to another the distance of the lower end of the picker-elevator from the ground may be increased or decreased and the weight thereof thrown to either side of the fulcrumed point of the strap $A^2$.

The rake-beam A is connected to the forward end of the rake-lever $B'$ by means of the strap $B^2$. Consequently as the rake-lever is raised or lowered the rake-beam will swing forward or back, (the link 6 turning upon its fulcrumed point or hinged connection 12 of the links 5 6,) so as to raise or lower the rake-teeth.

Upon the cross-shaft A' we secure a series of thimbles C, one for each rake-tooth, each of which is provided with an outwardly-projecting boss C'. The under face of this boss and thimble is provided with a semicircular groove $d'$, which is intersected by the vertical opening $d^2$ cut through the boss, the lower portion of the opening $d^2$ being enlarged so as to receive the eyebolt $C^2$, the shank of which extends through the opening $d^2$ and is secured in place by the nut $e$. The semicircular groove $d'$ forms a circular seat for the arm D of the rake-tooth D'. This arm passes through the eyebolt $C^2$, Figs. 1 and 5, and rests within the groove $d'$. By seating the arm D within the semicircular groove or seat the tooth is prevented from turning after the arm has been securely locked in place by the eyebolt $C^2$, which is drawn upward within its seat by the tightening of the nut $e$.

Within the rake beam or head A is fitted a series of sleeves $D^2$, one for each rake-tooth. These sleeves are held in place within openings of the rake-beam by screws $f$, which secure the flanges $f'$ of the sleeves to the under face of the said beam. Within the lower portion of each sleeve we cut the elongated opening $f^2$, through which the end of the arm of the rake-tooth fits, Figs. 1 and 2. Each sleeve has secured therein the coiled or spiral spring F, which bears upon the arm of the rake-tooth when fitted through the elongated slots of the sleeve, so as to regulate the give of the rake-tooth. The pressure of the spring may be increased or decreased through the medium of the screw-bolt F', fitted in the upper end of sleeve, the lower end of which bears upon the spring.

In order to remove a tooth, in case one becomes broken or otherwise damaged, it is only necessary to release the pressure of the spring F by raising the screw-bolt F' and loosening the nut $e$ of the thimble, which causes the eyebolt $C^2$ to lower. The rake-tooth may then be removed and another quickly inserted in place thereof.

By our device each tooth may be adjusted independent of the other, for by simply releasing or loosening the tension of the eyebolt the rake-tooth may be moved forward or backward, so as to adjust its position or to place it in alignment with the other rake-teeth.

The object of the extension of the part $A^3$ is to afford a longer leverage for the link or connecting-bar B, and by the curved perforated section 9, the fulcrum or pivot point of link B may be changed to vary the relative position between the teeth and picker-elevator.

Having thus described our invention, what we claim as new, and desire to secure protection in by Letters Patent, is—

1. The combination with the cross-beam, of the rake tooth beam, the cross-shaft, the connections $A^2$ between the shaft and rake tooth bar, the rake teeth connected with the rake tooth bar and the cross shaft, the upward extending sections of the connections $A^2$ having the perforated curved extension 9, the picker elevator, and the link B connected with the elevator and adjustably connected with the section 9, substantially as described.

2. The combination with the rake tooth beam, of a sleeve passing through and projecting above and below the same, having a closed bottom and registering elongated slots in its opposite sides, lateral flanges centrally on the sleeve secured to the beam, a spiral spring in the sleeve, a screw in the upper end of the sleeve, and a rake tooth passing through the slots below the spring having its rear end extending beyond the sleeve, substantially as described.

In testimony whereof we affix our signatures in presence of two witnesses.

SOLOMON V. REHART.
THOMAS E. BERNARD.

Witnesses to signature of Solomon V. Rehart:
N. A. ACKER,
W. H. COBB.

Witnesses to signature of Thomas E. Bernard:
L. F. CONN,
W. A. MASSENGILL.